Fig. 2.

April 16, 1940. H. J. JACOBS ET AL 2,196,991
CLARIFIER AND CLARIFIER SYSTEM
Filed Aug. 4, 1937 7 Sheets-Sheet 5

Inventors
Harold J. Jacobs
Carl F. Dahlberg
and Joseph J. Munson
Wilkinson & Mawhinney
Attorneys.

Patented Apr. 16, 1940

2,196,991

UNITED STATES PATENT OFFICE 2,196,991

CLARIFIER AND CLARIFIER SYSTEM

Harold J. Jacobs, Mathews, Carl F. Dahlberg, New Orleans, and Joseph J. Munson, Houma, La.

Application August 4, 1937, Serial No. 157,392

8 Claims. (Cl. 210—55)

The present invention relates to improvements in clarifiers and clarifier systems, and more particularly relates to the type of clarifier used for the clarification of liquors in various processes by the floatation method.

The invention contemplates the improvement of both the structure of the clarifier or clarifying unit, and the system in which one or more such units is included, as well as new features in the principle of operation of both clarifier and system.

Another object of the invention is to provide an improved clarifier and system in which the effectiveness of the treatments carried on is improved, and whereby better control of the various phases and steps of the process is had.

Heretofore, in previous types of clarifiers, it has been necessary to employ high temperatures over long periods of time to effect proper clarification. Such high temperatures and long time intervals are generally detrimental, causing in many instances deterioration and losses, thereby reducing the recovery of valuable products. Moreover in previous clarifiers no proper method and device has been evolved for promptly removing scum which remains in considerable quantities during the clarification treatment.

In accordance with the invention an improved scum remover is provided, and the time period of the treatment considerably reduced whereby the high temperatures will not adversely affect the product, and whereby heat treatments may be either carried on at lower temperatures or for shorter intervals of time.

With the foregoing and other objects in view, the invention will be more fully described hereinafter, and will be more particularly pointed out in the claims appended hereto.

In the drawings, wherein like symbols refer to like or corresponding parts throughout the several views.

Referring more particularly to Figures 3, 6 and 7, 15 represents the sloping bottom of an outer tank and 16 the similarly sloping bottom of an inner tank or receptacle.

Figure 3:
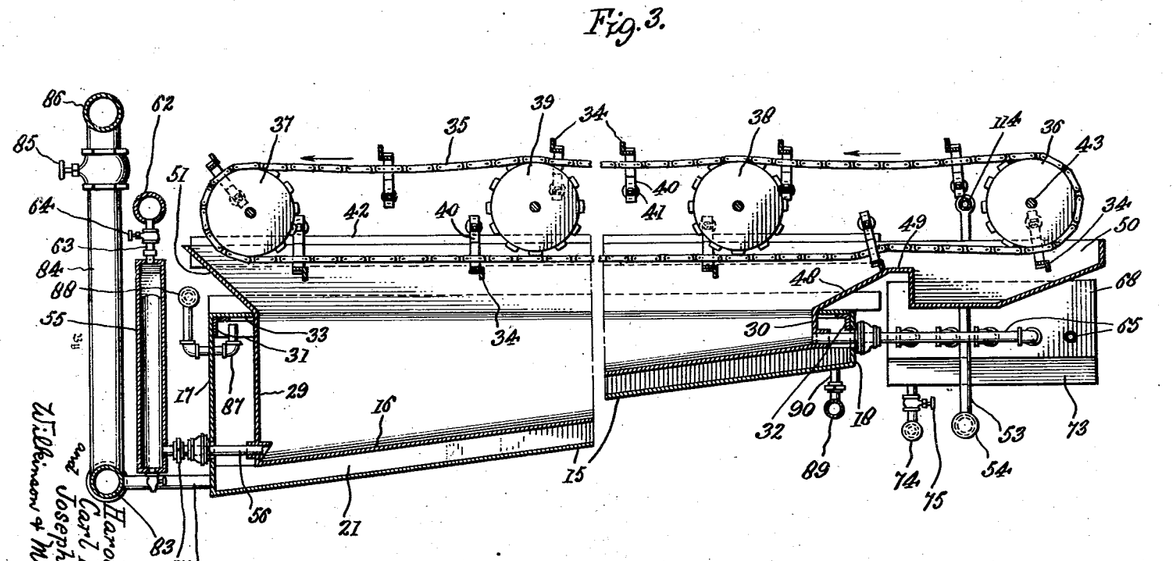
Figure 3 is a longitudinal vertical section taken along the line 3—3 in Figure 1.
Figure 6:
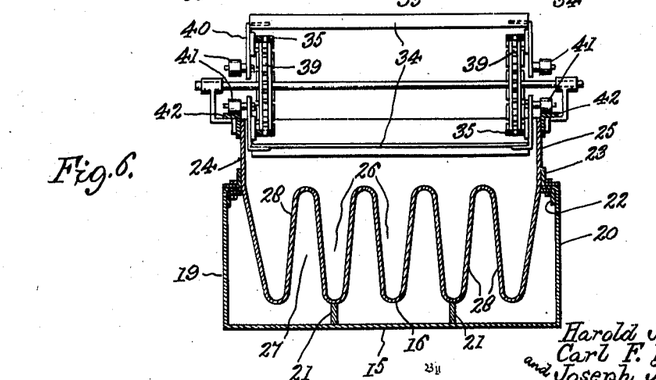
Figure 6 is a transverse vertical section taken on the line 6—6 in Figure 2.
Figure 7:
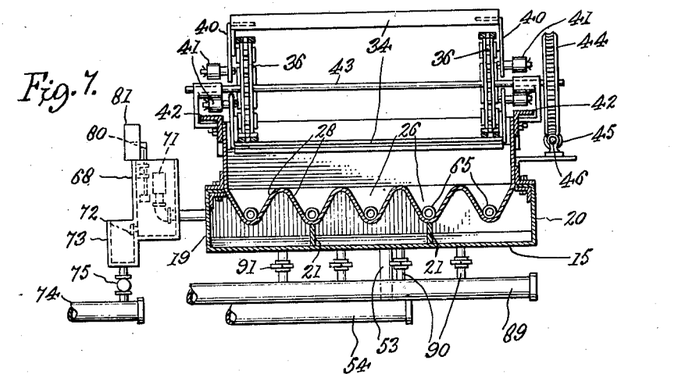
Figure 7 is a similar view taken on the line 7—7 of Figure 2.

The outer tank is closed at its ends by the end walls 17 and 18. The end wall 17 is deeper or higher in a vertical sense than the end wall 18 owing to the sloping bottom 15. The outer tank is closed on its sides by the side walls or plates 19 and 20. These walls are similar.

As shown in Figure 6, partitions 21, in any suitable number extend between the two bottoms 15 and 16 of the outer and inner tanks. The partitions 21 run longitudinally of the tanks. The side walls 19 and 20 are reinforced at their upper corner portions by angle irons 22 or the like. These angle irons 22 assist to support other angle irons 23 or suitable fittings for the support of the side walls 24 and 25 of the inner tank or receptacle.

As shown in Figure 6 these side walls 24 and 25 extend upwardly above the side walls 19 and 20 of the outer lower tank; and the angle irons or other fittings 23 may be welded or otherwise secured to such side walls 24 and 25 to support the inner tank within the outer tank.

As shown also in Figure 6 the bottom of the inner tank is formed in a series of waves running transversely of such inner container and forming a plurality of troughs 26, the walls of which are preferably flaring. These troughs extend longitudinally of the inner container and they substantially parallel and removed laterally from one another by the spaces 27 which open into communication at their lower portions with the interior space of the large outer tank. The spaces 27 are wider in a transverse sense at their lower portions than at their upper portions; while the troughs 26 which communicate with the interior space of the inner or upper receptacle are narrowest at their lower closed portions and widest at their upper parts where they communicate with the head space of such inner receptacle. In other words the walls 28 which constitute the wave-like formation of the inner receptacle bottom are flaring. The interior space of the inner receptacle constitutes a liquor compartment. This liquor compartment is made up of the bottom 16, the side walls 24 and 25 and end walls 29 and 30.

As shown in Figure 3 the end wall 29 is deeper vertically than the other end wall 30 due to the inclined bottom 16. Angle irons 31 and 32 may reinforce the upper corner portions of the end wall 17 and 18 and the top flange 33 of the outer tank in order to close in the interior space of such outer tank.

The outer tank thus envelops the inner receptacle along its sloping bottom, along its ends and at extensive portions of its sides. The closed interior space of the outer tank forms a heating chamber or a heating jacket for the inner receptacle or liquor compartment whereby the heating medium may flow through the spaces 27 between the troughs 26 occupied by the liquor. The relatively great volume of heating medium in the spaces 27 at opposite sides of a body of liquor in any given trough 26 will act to promote a rapid transference of heat through such liquor body and thus the time interval for the heat treatment of the liquor is materially reduced. At the same time the liquor is more thoroughly heated throughout and more effectively treated within a shorter space of time.

During the treatment mud or scum will form upon the surface of the liquor in the liquor compartment and it is desirable that such scum be removed and evacuated separately.

The skimming device is best seen in Figures 1, 2, 3, 5, 6 and 7 and constitutes generally skimming bars 34 extending transversely of the liquor compartment. The skimmers 34 are carried along by two endless chains 35 running over pairs of end sprockets 36 and 37. A suitable number of pairs of idler sprockets 38 and 39 are placed at intermediate points to suitably support the chains, or rather the upper runs thereof. Pairs of arms 40 are affixed to the chains in any suitable manner for carrying the skimmer bars 34. The skimmer bars 34 are supported at the outer ends of the pairs of arms 40. At their inner ends such arms 40 carry rollers 41 disposed to ride upon tracks 42. These tracks are illustrated to be in the form of angle iron although their cross-sectional configuration is not critical. These tracks 42 may be secured to the upwardly projecting side walls 24 and 25 of the inner receptacle, as shown in Figure 6, by bolts or screws arranged to permit proper adjustment of the tracks in a horizontal or inclined position with the necessary vertical displacement to effect the proper engagement of the scum by the skimmer bars 34.

The sprockets 36 are fixedly mounted upon a drive or head shaft 43 by which motion is imparted to the chains 35. The various other pairs of sprockets are mounted upon idler shafts as indicated.

Figure 2:
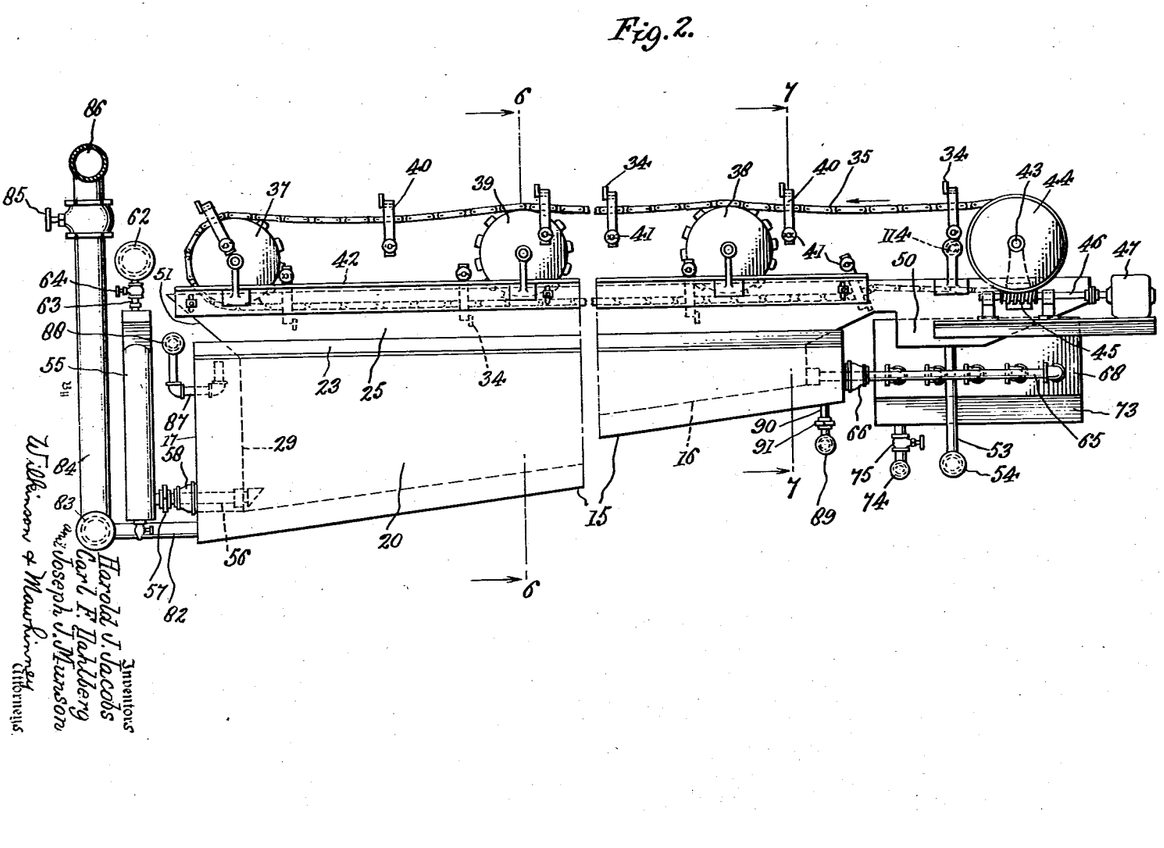
Figure 2 is a side elevation of the same with parts broken away and parts shown in section.

As shown more particularly in Figures 2 and 7 the head shaft 43 carries fixedly thereon a worm wheel 44 disposed in mesh with a worm pinion 45 on the shaft 46 of an electric motor 47.

The chains 35 are driven in the direction of the arrow shown in Figure 3; that is, the upper runs of chains move to the left while the lower runs of such chains move to the right. The operative motion of the skimmer bars 34 is thus from left to right in Figure 3. As will be hereinafter described the deeper or left end of the liquor compartment is the receiving end, the clarified liquor being withdrawn at the shallower end. Thus the skimmer bars 34 move in the direction of liquor movement during clarification treatment and the scum forming on top of the liquor in the liquor compartment is moved along by skimmers toward the outlet end of the liquor compartment. In so doing, as shown in Figure 3, the skimmer bars encounter the inclined plane or wall 48 which is an extension portion of the end wall 30 of the inner receptacle. Such incline wall 48 causes the skimmer bars 34 to ride upwardly, lifting the chains 35 with them and causing the scum entrained with the skimmer bars 34 to be pushed over the weir 49 and thence into the scum depository or tank 50. The bottom of this tank 50 is depressed below the weir 49.

The deeper end wall 29 of the inner receptacle is also preferably inclined where it extends above the closed top of the outer tank, such inclined part being indicated at 51, this inclination being for the purpose of allowing for clearance for the operation of the skimmer bars about the end idler sprockets 37.

The mud and scum driven by the skimmer bars into the scum compartment 50 finds ready egress out of the bottom port 52 and through the take-off pipes 53 and 54. The electric motor may be operated continuously or intermittently as desired.

As shown more particularly in Figures 3, 4, 8 and 9 the liquor enters the liquor compartments through a plurality of liquor inlet risers 55.

Figure 4:
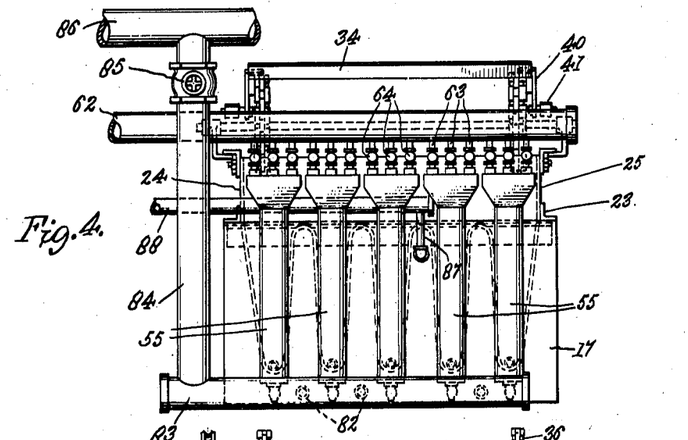
Figure 4 is an end elevation as seen from the left of Figure 2.
Figure 5:
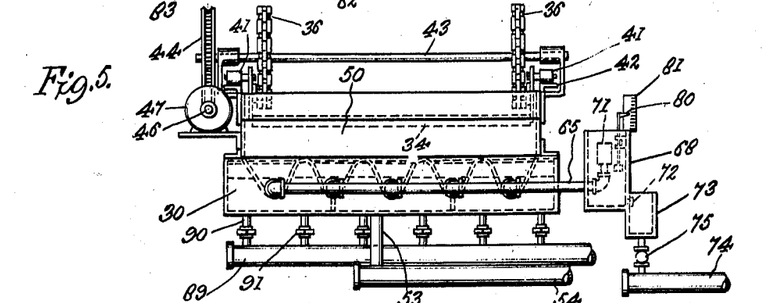
Figure 5 is an end elevation seen from the right of Figure 2.

In Figure 6 five troughs 26 are shown; and in Figure 4 five inlet risers 55 are illustrated, the same being placed directly in line with the end portions of their respective troughs. The lower portion of each riser 55 communicates with an end portion of its trough by an inlet pipe 56. As shown in Figure 3 the inlet pipes communicate with the deep ends of the troughs 26 and very close to the bottom portions of such deep ends. Unions 57 may be included in the pipes 56. Flexible sealing devices extend about the pipes 56. Such sealing devices are shown more particularly in Figure 9 and include a rubber or other ring or collar 58 bound at one end by a band 59 about the pipe 56, and by a band 60 about the other end of the ring to a flange 61 of the outer tank end wall 17. Thus none of the heating fluid in the heating jacket is permitted to escape around the pipes 56.

Figures 8, 10, 11:
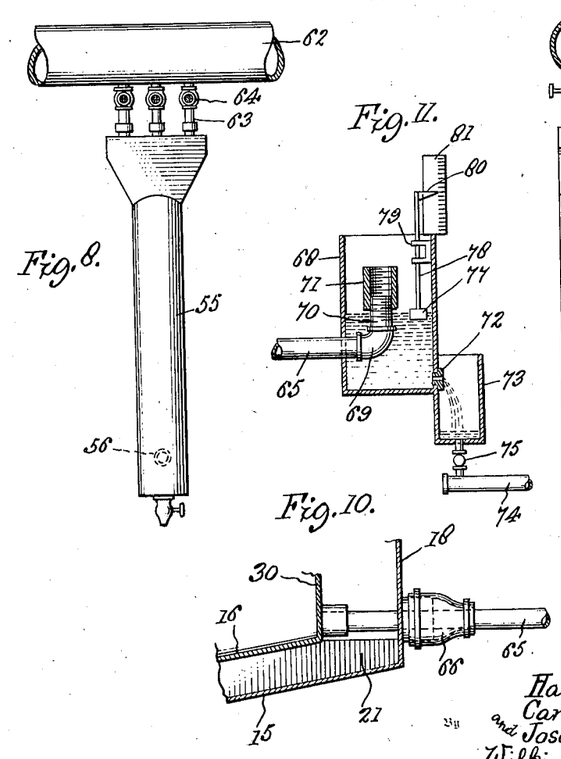
Figure 8 is a view of one of the inlet headers with supply pipe shown in section.
Figure 10 is a fragmentary vertical section through portions of the inner and outer tanks showing one of the outlet connections.
Figure 11 is a vertical section taken through the liquid level control device.
Figure 9:
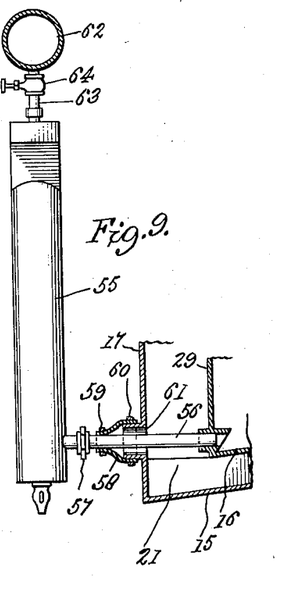
Figure 9 is a side view of the inlet header with the supply pipe and the bottom tank connections shown in section.

As shown more particularly in Figures 4, 8 and 9, the risers 55 receive the liquor from a header 62. For each riser 55 the header has a group of discharge nozzles 63. For convenience of illustration we have illustrated three such nozzles 63 in a group. These nozzles 63 are separate and independent of one another. Flow through each is under the control of a separate valve 64. The port areas of these nozzles may be the same or different in each group. Whether the same or different, each group of nozzles afford a wide range of adjustability of liquor intake. Only one of the nozzles may be open, or if desired both nozzles may be open in which case double the flow of liquor is had. In other cases the maximum flow volume may be had by opening all three valves 64.

Figure 1:
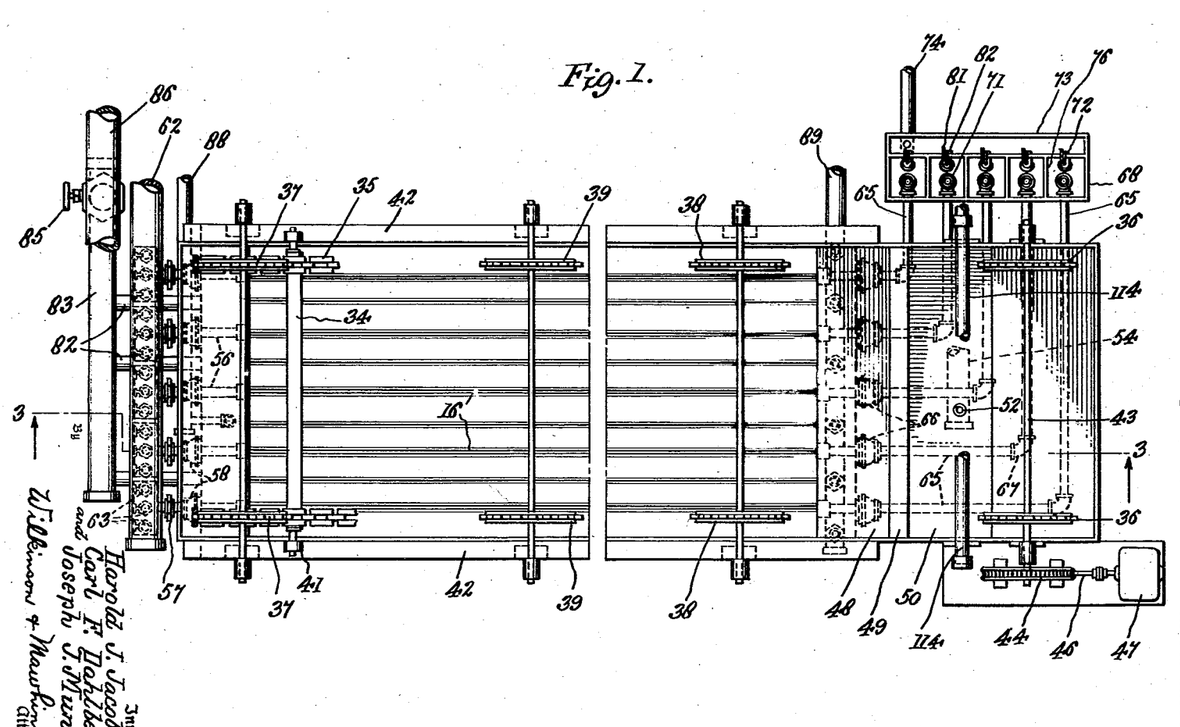
Figure 1 is a top plan view of a clarifier constructed in accordance with the present invention parts being broken away.

As heretofore stated the liquor moves from the deep end of the inner receptacle toward the right in Figure 3 to the shallower end thereof. This shallower end is the discharge end. The discharge is shown more particularly in Figures 3, 5, 7, 10 and 11. The discharge is outwardly through discharge pipes 65. As shown in Figure 10 these pipes extend through both end walls 18 and 30 of the outer tank and inner receptacle. Sealing devices 66, of the character heretofore described, or of other suitable character, are mounted in connection with the pipe 65 and the end wall 18 of the outer tank. As heretofore explained there are five troughs forming the bottom of the liquor compartment. In Figure 7 the shallower end of the trough is seen where five outlet pipes 65 are shown as being disposed in alinement, one pipe 65 with each of the troughs. Figure 1 illustrates that each of the five discharge pipes 65 has an elbow connection 67 therein to enable the discharge pipes to extend over to a constant level tank 68. The tank 68 forms a liquor overflow tank for the liquor compartment. Each discharge pipe in the tank 68 has an elbow 69 carrying an upstanding threaded nipple 70 on which is adjustably screwed a sleeve 71. In the side of the overflow tank 68 near its bottom is a liquor discharge orifice having a perforated plug 72 therein. The orifice is arranged to discharge the liquor into a discharge trough 73. The trough 73 connects with a header 74 by means of a valve connection 75.

As shown in Figure 1, the overflow tank 68 is divided by partitions 76 into a number of separate compartments corresponding in number to the number of troughs 26 in the liquor compartment of the receptacle. Separate perforated plugs 72 are provided for each compartment. However, the trough 73 extends in common to all of the perforated plugs 72 and one outlet 75 is sufficient for the common trough 73.

As shown more particularly in Figure 11, each compartment of the overflow tank 68 contains a float 77 carrying a rod 78 running through a guide 79 and having at its upper end an index or pointer 80 moving over a scale 81.

The sleeves 71 may be individually adjusted up and down. The liquor from the respective trough of the liquor compartment will spill over the upper end of the sleeve.

Consequently, the height of the upper end of sleeve 71 will determine the constant level maintained in the trough. The liquor spilling over the sleeve 71 will accumulate in the compartment of the overflow tank 68. The outlet of this overflow liquor depends upon the head of liquid in the compartment 68 and the port area of the orifice in plug 72. The rate of discharge of this liquor from tank 68 to trough 73 is shown on scale 81 by the index 80. If a plug 72 having a large orifice is selected the discharge flow will be at a greater rate, the float 77 will fall with the receding liquid level and the index 80 will indicate this condition on the scale 81. On the other hand if a plug 72 having small port area is selected, then the head of fluid in the overflow tank 68 will tend to increase and rise, carrying upwardly the float 77 and index 80 to reflect this condition on the scale 81. The velocity of discharge of the liquor may be regulated by plug selection but the rate of discharge must equal rate of entrance.

Connected to the end of the outer tank at the liquor inlet end are heating fluid outlet pipes 82 best seen in Figures 1, 2, 3 and 4. The outlet pipes 82 lead into a header 83 provided with a riser 84, valve 85 and piping 86.

The outer tank, or in other words the heating jacket space, is provided with a vent pipe 87 connected to a header 88.

The outer tank or heating jacket is provided at the liquor discharge end with a heating fluid header 89 connected to the tank by means of pipes 90, preferably having unions 91 therein.

Figure 12:
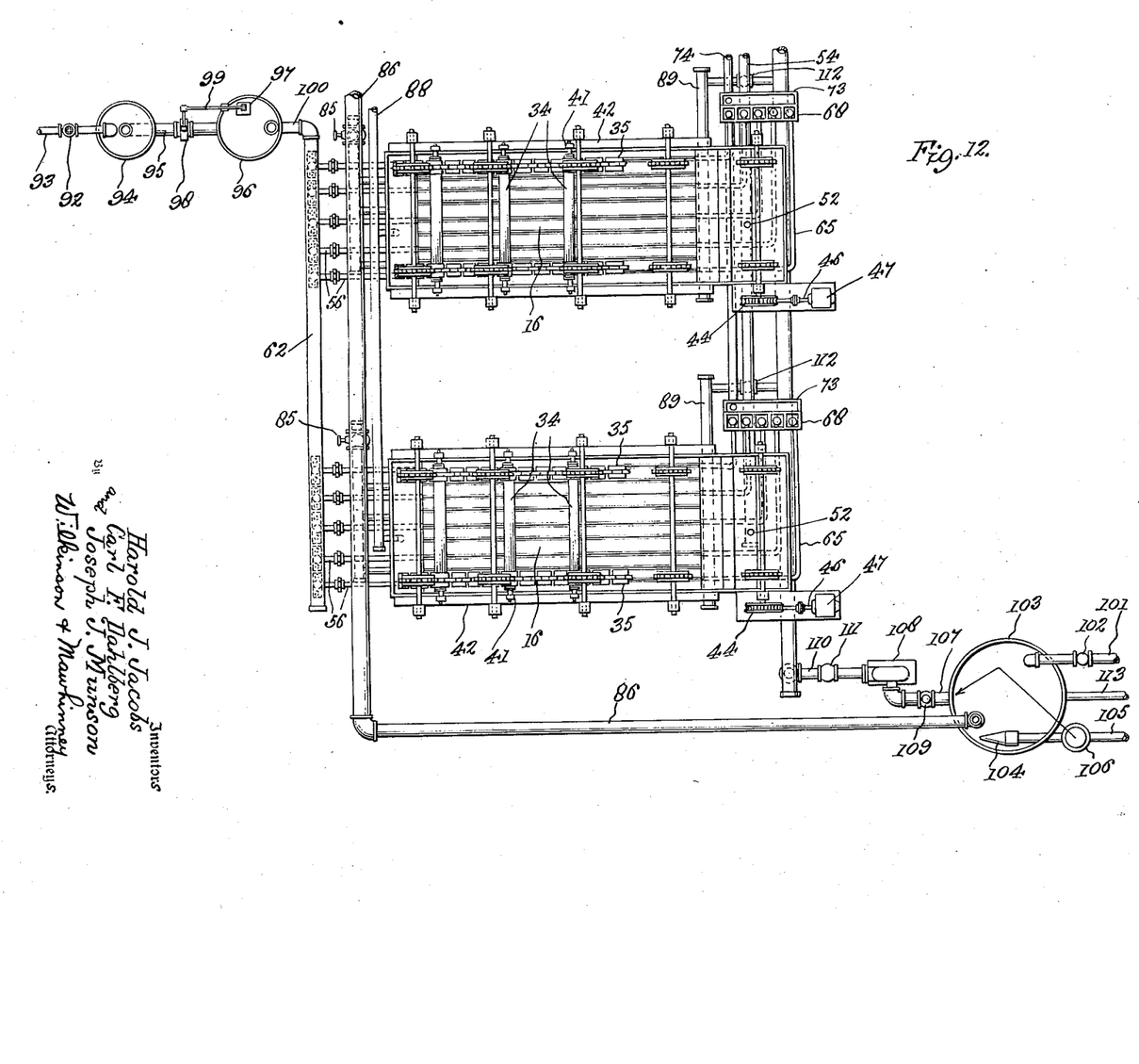
Figure 12 is a diagrammatic view showing the improved system with two of the clarifiers included.
Figure 13:
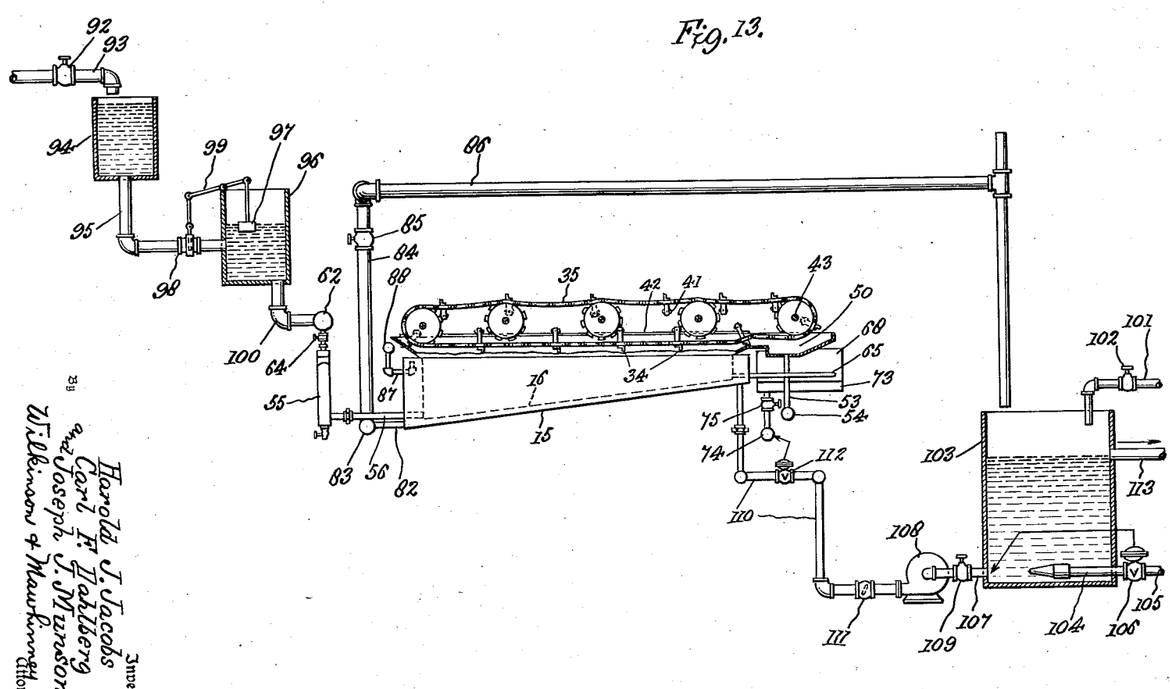
Figure 13 is a vertical longitudinal section taken through parts of the system.

Referring more particularly to Figures 12 and 13, the liquor to be clarified may be received through valve 92 and conveyed by piping 93 to a receiving vessel or tank 94. Through the pipe 95 the liquor from the receiving tank 94 is conveyed to a constant level control tank 96. In the tank 96 is a float 97 connected to a float-controlled valve 98 through the link 99. Bottom of tank 96 is connected by pipe 100 to the header 62.

The heating fluid enters through a supply pipe 101 under control of a valve 102. The pipe 101 is disposed above a heating fluid receiving tank 103 in the bottom of which is mounted a steam injector or other form of heater 104, steam being supplied to this injector through a pipe 105 having therein a thermostat valve 106. The thermostat for valve 106 is preferably disposed close to the outlet of the heating fluid from tank 103. The outlet pipe is indicated at 107, communicating with a centrifugal or other pump 108.

A valve 109 in the suction pipe 107 controls the withdrawal of liquid. The discharge side of the pump 108 is connected through pipe 110 to the outer tank or the heating jacket at the liquor discharge end thereof. In the pipe is a check valve 111 and a thermostat valve 112 controlled by the liquor temperature in the header 74.

The operation of the clarifier for the specific application of clarifying melt liquor in sugar refineries by the floatation method is as follows:

Heating fluid, either water or liquids with high boiling points, such as, for instance, water having its density raised by the addition of soluble matter, is introduced into the tank 103 by means of pipe 101 under the control of the manual valve 102. A constant level of the heating fluid may be maintained in the reservoir 103 by means of the overflow pipe 113.

To put the system in operation, the valve 109 is opened and the pump 108 started and kept in continuous operation. The pump will withdraw the liquid from the reservoir 103 through the pipe 107 and circulate such fluid to the piping 110 and through the normally open valves 111 and 112 therein to the outer tank or jacket at the higher end of its sloping bottom 15. The heating fluid flows through the space 27 surrounding the troughs 26 and through the pipe 82 into the header 83 and the riser 84 through the valve 85 and the pipe 86 back to the supply tank 103. The thermostat valve 112 will naturally remain open until hot liquor appears in the header 74.

The pump 108 is allowed to operate continuously, and the liquid to flow continuously from supply pipe 101 into the reservoir 103 until the heating jacket is filled and until the reservoir 103 is brought up to the overflow 113.

Steam will now be turned into the pipe 105 and allowed to flow through the thermostat valve 106 to the heater 104. Steam pressure is carried on the pipe 105 throughout the operation of the clarifier.

The liquid in the reservoir 103 will thus be heated at the same time that it is being circulated by the pump 108 until the proper operating temperature is reached both in the reservoir 103 and in the clarifier heating jacket. At this point, the thermostat valve 106 will throttle the steam and hold the temperature constant thereafter.

Liquor to be clarified having previously been treated either mechanically or chemically, or both, will now be introduced into the tank 94 through the operation of the manual valve 92 and by means of the piping 93. This tank 94 will be kept partially filled throughout the operation. From the tank 94 the liquor will flow through tubing 95 to tank 96 until the float 97 actuates the float valve 98 and thereby brings the liquor to a definite and constant level.

Manual valves 64 will now be opened in sufficient numbers to admit a proper flow of liquor to the risers 55, the rate being fixed by the constant level in tank 96 and the size or port area of cross section of the pipes or nozzles 63. When it is desired to open valve 64 it is preferable to open same to the fullest extent. The different rates of flow are maintained by opening one or more of the three valves 64 which form a group for each header 55; thereby giving several selective but definite rates of flow in the riser 55.

From the risers 55, the liquor flows through pipes 56 to each of the flared troughs 26 of the liquor compartment. This action is allowed to continue throughout the operation of the clarifier. The liquor in tank 96 is kept at a constant level by the action of the float 97 admitting liquor through the float valve 98 from supply tank 94 in the proper amount.

It is now apparent that the flared troughs 26 will each be filled until pipes 65 on the liquor discharge end are filled and the level brought up to the tops of the sleeves 71.

At this point, the liquor in the liquor compartment will have risen above the tops of the flared troughs 26.

The outer tank or heating jacket with the vent pipe 87 open, having previously been filled with hot liquid maintained in circulation by the pump 108, will cause heat to be conducted into the liquor in the flared troughs 26, and the liquor will be heated as liquor compartment fills and remain full. If the proper rate of flow through the nozzles 63 has been maintained during the filling of the liquor compartment, the liquor, on reaching a level even with the tops of the adjustable sleeves 71, will have been properly clarified, and the impurities therefrom will have begun to accumulate on the surface of the liquor in the form of a scum. The flow of the liquor to the liquor compartment is allowed to continue, adjusting the proper rate from time to time, causing overflow to start at the tops of the adjustable sleeves 71 and the scum blanket to thicken. After this scum blanket has risen to the proper height above the surface of the liquor, the electric motor 47 is started, which puts into operation the skimming device. The lower pass of the device traveling in the direction of the arrow indicated in Figure 2 causes the skimmer bars 34 to engage the scum and slowly move it over the inclined end 48 into the scum compartment 50. From this compartment the scum flows away through the pipes 53 and the header 54.

The clarified liquor, on overflowing the sleeves 71, falls down into the liquor overflow tank 68 shown in Figure 11. From this tank 68 such liquor flows out through the restricted orifice in the plug 72 at the same rate that it passes over the sleeves 71, after its level in the tank 68 has reached some such point as that shown in Figure 11. In other words after a suitable head of liquid has accumulated in the tank 68. From the orifice in plug 72 the liquor passes into the discharge trough 73 and away through valve 75 to the header 74. This hot liquor, coming in contact with the thermostat element in header 74, actuates thermostat valve 112 which keeps the discharged liquor temperature constant by regulating the flow of the heating fluid to the jacket of the clarifier, which insures the proper temperature being carried in the various flared troughs 26 of the liquor compartment. This is very desirable in the proper operation of the apparatus.

In order to check the rate of discharge of each of the flared troughs of the liquor compartment, the scale 81, shown in Figure 11, is graduated to reflect rates of discharge through the orifice in plug 72 for the various heads that will be indicated by the index 80. The checking of the discharge from each of the troughs is desired and the discharge rates of all troughs in a clarifier must be the same in order to avoid any possibility of a transverse flow over the tops of the flared troughs 26 in the liquor compartment. Such a transverse flow would indicate an unequal distribution of liquor supplied to the troughs from tank 96.

Any such unequal distribution could be immediately adjusted by the valves 64 of Figures 8 and 9. In order to provide a speed regulation of the skimmer bars 34, the motor or driving unit 47 may be of variable speed. The treatment of various liquors to be clarified, before their entrance to the tank 94 through valve 92 and pipe 93, depends on their nature, different liquors requiring different chemical and mechanical treatment. The particular liquor selected for this description is a sugar refinery melt treated chemically with phosphoric acid and lime, and physically or mechanically with air introduced in the form of entrainment.

The troughs 26 of the liquor compartment, as shown in Figure 6, are narrow and enveloped by heating fluid on the bottom and on both extensive side walls of each trough. As shown in Figures 2 and 3 the troughs 26 have diminishing depth from the inlet to the outlet ends. This construction is provided to insure that the cold liquor entering will not travel along the bottoms of the troughs 26 and thereby reach the discharge end before the scums are driven off. It may be seen that, should this happen, the scums from the cold liquor would travel upward at the extreme discharge end and thereby get into the liquor leaving the troughs.

With regard to the skimming device, it has been heretofore proposed to use scum removers in the older types of clarifiers of the floatation group, but such means was only for the purpose of aiding the scums over the discharge ends of the tank, and no means whatsoever was employed for forcing the scum from the liquor inlet end to the point at which it is discharged. In accordance with the present invention the skimmer bars 34 first engage the scum at the extreme end of the tank opposite to where the discharge of the scum takes place, insuring the positive movement throughout the entire length of the tank; this same skimmer element being also the means for effecting the final discharge of scums.

The variable drive for the skimming device is also a desirable feature. Another desirable feature is the arrangement which permits the skimmer bars 34 to engage the scum blanket a considerable distance below the tracks 42 which guide them. This avoids the dragging or smearing of the scum on surfaces over which it might be moved. In other words, the guiding element of the skimmer bars 34 is far enough removed from the scum blanket to avoid collecting scums.

As shown more particularly in Figure 3, a perforated pipe 114 in communication with a source of cleaning fluid supply is disposed above the scum tank 50 and above the path of the skimmer bars 34 in order that cleaning fluid may be sprayed downwardly from such pipe 114 onto the skimmer bars 34 after they have deposited the scum in the tank 50. The scum tank 50 will catch this wash fluid and such wash fluid will tend to promote the rapid flow of the scum into the pipes 53 and the header 54. In other words the wash water will facilitate the evacuation of the scum from the apparatus.

The flexible sealing devices 58 and 66 shown in Figures 9 and 10 not only prevent leakage of the heating fluid from the outer tank or heating jacket but they provide a novel means of taking care of expansion and contraction.

It will be noted that the construction of the clarifier is such as to admit of the quick removal of the entire inner receptacle or liquor compartment from the outer tank or heating jacket by simply withdrawing a few bolts.

Figures 12 and 13 exhibit a new method of operating clarifiers which consists in maintaining the liquor temperature regulated by the use of a heating fluid, which fluid is circulated and, at the same time, kept at a constant temperature by thermostat valve 106, together with the quantity regulation effected by thermostat valve 112 controlled by the temperature of the discharge liquor from the liquor compartment.

It is obvious that various changes and modifications may be made in the details of construction and design of the above specifically described embodiment of this invention without departing from the spirit thereof, such changes and modifications being restricted only by the scope of the following claims.

What is claimed is:

1. An improved clarifier comprising an inner receptacle forming a liquor compartment and composed of a series of longitudinally extending and separated narrow troughs, a heating jacket extending about the bottom, the sides and the ends of said narrow troughs, said narrow troughs being spaced apart laterally, the spaces between said troughs communicating with the interior heating space of said heating jacket, the bottoms of the narrow troughs sloping from end to end of the receptacle, forming deep and shallow ends, means for introducing the liquor to be clarified at deep portions of the deep ends of the troughs, means for drawing off the clarified liquor at the shallow ends of the troughs, and means for circulating a heating medium through said jacket.

2. An improved clarifier comprising an inner receptacle forming a liquor compartment and composed of a series of laterally spaced longitudinally extending narrow troughs having side walls which converge downwardly, a heating jacket extending about said receptacle and having an interior heating space extending up between the side walls of said troughs, said jacket having a bottom wall spaced below said troughs, the bottoms of the troughs being inclined to form deep and shallow ends for the troughs, means to introduce liquor at low points in the deep ends of the troughs, means at the shallow ends for drawing off the liquor, and partitions between said bottom wall of the jacket and the lower parts of certain of the bottoms of the troughs.

3. An improved clarifier comprising a receptacle forming a liquor compartment, means for introducing liquor to one end portion of said compartment, means for withdrawing the clarified liquor from the other end portion of said compartment, said compartment being of diminishing depth from the inlet to the liquor discharge end, skimmers movable longitudinally of said compartment, means for moving said skimmers, and means supporting said skimmers relative to said compartment whereby said skimmers may be adjusted to extend into said compartment independently of the means for moving the skimmers.

4. An improved clarifier comprising a receptacle forming a liquor compartment having a wave-like bottom forming a plurality of longitudinally extending separated troughs with downwardly convergent side walls, said bottom of the receptacle sloping from end to end to provide a deep end and a shallow end, a heating jacket extending about the bottom, sides and ends of said receptacle and having a sloping bottom spaced from the sloping bottom of the receptacle, partitions between the sloping jacket bottom and certain of said troughs, means for circulating a heating medium through said jacket, means for introducing cold liquor to the deep end of the compartment near the lowermost end of the sloping bottom, means for withdrawing the clarified liquor from the shallow end portion of the compartment, and means for removing the scum from the surface of the liquor in the compartment.

5. An improved clarifier comprising a receptacle forming a liquor compartment, vertically adjustable tracks at the sides of said compartment, skimmers movable along the upper portion of said compartment, an endless skimmer operator, means slidably securing said skimmers to said operator for slidable movement at right angles to the length of said operator, and rollers carried by said means riding on said tracks for supporting said skimmers therefrom and for guiding the skimmers in their motion through the compartment, and means for operating the endless skimmer operator.

6. An improved clarifier comprising a receptacle forming a liquor compartment having a sloping end wall, a weir beyond said end wall, a scum tank beyond said weir, means for carrying off the scum from said tank, vertically adjustable tracks at the sides of said compartment, endless chains mounted above said compartment, means for supporting and for driving the chains, arms dependent upon said chains inside the compartment, skimmer bars connecting said arms within the compartment, rollers projecting outwardly from said arms above the skimmer bars for riding upon said tracks, said skimmer bars and chains being so positioned with relation to said inclined end wall whereby the skimmer bars will encounter the end wall and ride up the same over said weir.

7. An improved clarifier comprising a receptacle forming a liquor compartment having a sloping end wall, a weir beyond said end wall, a scum tank beyond said weir, means for carrying off the scum from said tank, vertically adjustable tracks at the sides of said compartment, endless chains mounted above said compartment, means for supporting and for driving the chains, arms dependent upon said chains inside the compartment, skimmer bars connecting said arms within the compartment, rollers projecting outwardly from said arms above the skimmer bars for riding upon said tracks, said skimmer bars and chains being so positioned with relation to said inclined end wall whereby the skimmer bars will encounter the end wall and ride up the same over said weir, and a spray pipe above said scum tank and above the path of said skimmer bars with openings for directing cleaning fluid downwardly upon the skimmer bars.

8. An improved clarifier comprising a receptacle forming a liquor compartment, means for introducing liquor to said compartment, said compartment composed of a number of troughs separated from one another at their lower portions and communicating above in the head space of the compartment, a riser, a number of pipes connecting said riser with said troughs, a constant level float tank for the liquor, a header for receiving the liquor from said constant level tank, a group of separately controlled nozzles between said header and each of said risers, and a supply tank for supplying under control said constant level tank.

HAROLD J. JACOBS.
CARL F. DAHLBERG.
JOSEPH J. MUNSON.